US009578658B2

(12) United States Patent
Yang et al.

(10) Patent No.: US 9,578,658 B2
(45) Date of Patent: Feb. 21, 2017

(54) BACKOFF METHOD AND DEVICE USED FOR WIRELESS COMMUNICATION SYSTEM

(71) Applicant: Huawei Technologies Co., Ltd., Shenzhen (CN)

(72) Inventors: Xun Yang, Shenzhen (CN); Yunbo Li, Shenzhen (CN); Tianyu Wu, Shenzhen (CN); Hufei Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 268 days.

(21) Appl. No.: 14/086,718

(22) Filed: Nov. 21, 2013

(65) Prior Publication Data

US 2014/0079046 A1 Mar. 20, 2014

Related U.S. Application Data

(63) Continuation of application No. PCT/CN2012/073708, filed on Apr. 10, 2012.

(30) Foreign Application Priority Data

May 25, 2011 (CN) .......................... 2011 1 0137312
Jul. 22, 2011 (CN) .......................... 2011 1 0207393
Aug. 1, 2011 (CN) .......................... 2011 1 0218469

(51) Int. Cl.
*H04W 74/08* (2009.01)
(52) U.S. Cl.
CPC ................................ *H04W 74/0825* (2013.01)

(58) Field of Classification Search
None
See application file for complete search history.

(56) References Cited

U.S. PATENT DOCUMENTS

| 7,664,089 | B2 | 2/2010 | Zhao | |
|---|---|---|---|---|
| 2005/0036448 | A1 | 2/2005 | Leeuwen | |
| 2005/0254465 | A1 | 11/2005 | Lundby et al. | |
| 2006/0187840 | A1* | 8/2006 | Cuffaro et al. | ............... 370/235 |
| 2007/0019591 | A1* | 1/2007 | Chou et al. | ................... 370/337 |

(Continued)

FOREIGN PATENT DOCUMENTS

| CN | 101401334 A | 4/2009 |
|---|---|---|
| CN | 101548573 A | 9/2009 |

(Continued)

OTHER PUBLICATIONS

Foreign Communication From a Counterpart Application, Chinese Application No. 201110218469.9, Chinese Office Action dated Jul. 3, 2014, 4 pages.

(Continued)

*Primary Examiner* — Shaq Taha
*Assistant Examiner* — Manuel Rangel
(74) *Attorney, Agent, or Firm* — Conley Rose, P.C.

(57) ABSTRACT

An apparatus, method, and system to provide a backoff method and device used for a lower priority access category AC. The method includes: when the lower priority AC and another AC in a same station STA obtain a transmission opportunity TXOP at the same time and an internal collision occurs, detecting a TXOP sharing state of the lower priority AC; and executing backoff of the lower priority AC according to the detected TXOP sharing state.

19 Claims, 7 Drawing Sheets

(56) References Cited

U.S. PATENT DOCUMENTS

| | | | |
|---|---|---|---|
| 2007/0258419 A1 | 11/2007 | Zhao et al. | |
| 2008/0112351 A1 | 5/2008 | Surineni et al. | |
| 2010/0284380 A1 | 11/2010 | Banerjee et al. | |
| 2010/0296466 A1 | 11/2010 | Mignot et al. | |
| 2011/0268054 A1* | 11/2011 | Abraham et al. | 370/329 |
| 2012/0008490 A1* | 1/2012 | Zhu | 370/216 |
| 2012/0051342 A1* | 3/2012 | Liu et al. | 370/338 |
| 2012/0140615 A1* | 6/2012 | Gong | 370/216 |

FOREIGN PATENT DOCUMENTS

| | | |
|---|---|---|
| CN | 101569139 A | 10/2009 |
| CN | 101855873 A | 10/2010 |
| RU | 2285342 C2 | 10/2006 |
| WO | 2005069878 A2 | 8/2005 |
| WO | 2007082229 A2 | 7/2007 |

OTHER PUBLICATIONS

Foreign Communication From a Counterpart Application, Chinese Application No. 201110218469.9, Chinese Search Report dated Jun. 6, 2014, 3 pages.

Zhu, C., et al., "Multi-User Support in Next Generation Wireless LAN," The 8th Annual IEEE Consumer Communications and Networking Conference, 2011, pp. 1120-1121.

"Part 11: Wireless LAN Medium Access Control (MAC) and Physical Layer (PHY) Specifications, Amendment 8: Medium Access Control (MAC) Quality of Service Enhancements," IEEE Std 802.11e, Nov. 11, 2005, 7 pages.

Foreign Communication From a Counterpart Application, PCT Application No. PCT/CN2012/073708, English Translation of International Search Report dated Jul. 19, 2012, 2 pages.

Foreign Communication From a Counterpart Application, PCT Application No. PCT/CN2012/073708, English Translation of Written Opinion dated Jul. 19, 2012, 6 pages.

Foreign Communication From a Counterpart Application, Russian Application No. 2013157533, Russian Accompanying Letter dated Jul. 15, 2015, 1 page.

Foreign Communication From a Counterpart Application, Russian Application No. 2013157533/08, Russian Office Action dated May 29, 2015, 3 pages.

Foreign Communication From a Counterpart Application, Russian Application No. 2013157533/08, English Translation of Russian Office Action dated May 29, 2015, 3 pages.

Foreign Communication From a Counterpart Application, Russian Application No. 2013157533, Russian Notice of Allowance dated Aug. 19, 2015, 11 pages.

Foreign Communication From a Counterpart Application, Russian Application No. 2013157533, English Translation of Russian Notice of Allowance dated Aug. 19, 2015, 7 pages.

* cited by examiner

BACKOFF METHOD AND DEVICE USED FOR WIRELESS COMMUNICATION SYSTEM

CROSS-REFERENCE TO RELATED APPLICATIONS

This application is a continuation of International Application No. PCT/CN2012/073708, filed on Apr. 10, 2012, which claims priority to Chinese Patent Application No. 201110137312.3, filed on May 25, 2011, Chinese Patent Application No. 201110207393.X, filed on Jul. 22, 2011 and Chinese Patent Application No. 201110218469.9, filed on Aug. 1, 2011, all of which are hereby incorporated by reference in their entireties.

FIELD

The present invention relates to the field of communications, and specifically, to a system, and a backoff method and device used for a lower priority access category (AC) in a wireless communication system.

BACKGROUND

In a wireless communication system adopting distributed access (such as a Wireless Local Area Network (WLAN)), an access premise of its channel is that all stations (STAs), including common user-oriented stations and Access Points (APs), are viewed as equal STAs. An access manner is that each STA randomly generates backoff time in a contention window (CW) and contends for obtaining the channel by decreasing to zero. An advantage of the manner is that all the stations can obtain an access opportunity from the angle of a statistical probability, and there is no need of a dedicated device with powerful functions to implement central scheduling.

Specifically, for a quality of service (QoS) STA (QSTA), for example, all services are classified into 4 types: AC Video (AC_VI), AC Voice (AC_VO), AC Best Effort (AC_BE) and AC Background (AC_BK); and then, on the basis of this, different services are assigned different contention windows CW[AC], and delays before contention of different services are different. In this way, on a premise of ensuring that all have access opportunities, priorities of the video and voice are improved and priorities of the other two types of services are relatively reduced from the angle of statistics, that is, the video and the voice have the higher priorities and the best effect data and the background stream have the lower priorities.

In an Enhanced Distribution Coordinate Access (EDCA) mode, 4 ACs of each QoS STA are all similar to non-QoS STAs, they not only need to contend with ACs of other STAs or other QoS STAs for a right to use the channel, but also contend with ACs of the present STA for the right to use the channel. For a certain AC, various possible situations are inevitable to trigger a backoff process (that is, adjust the contention window, take a value randomly in the contention window, decrease progressively along with time according to the value, and resend its contention channel after decreasing to zero).

If the AC and another AC of the same STA obtain a transmission opportunity (TXOP) at the same time, it is referred that the AC and the another AC (generally an AC of a higher priority) have an internal collision.

When contention occurs, the higher priority AC obtains channel access, and initiates data transmission.

However, if the higher priority AC obtains the channel access when contention occurs, the lower priority AC triggers the backoff process. Frequently triggering the backoff process will greatly affect fairness of the lower priority AC, and limit a service of the lower priority AC.

SUMMARY

Embodiments of the present invention provide a method and device for executing backoff by detecting a TXOP sharing state.

In an aspect of an embodiment of the present invention, a backoff method used for a lower priority AC is provided, the method includes: when the lower priority AC and another AC in a same STA obtain a TXOP at the same time and an internal collision occurs, detecting a TXOP sharing state of the lower priority AC; and executing backoff of the lower priority AC according to the detected TXOP sharing state.

In another aspect of an embodiment of the present invention, a wireless terminal station STA is provided, and the STA includes: a detecting unit, configured to, when two access categories ACs of the STA obtain a transmission opportunity TXOP at the same time and an internal collision occurs, detect a transmission opportunity TXOP sharing state of a lower priority AC; and a backoff executing unit, configured to execute backoff of the lower priority AC according to the detected TXOP sharing state.

According to another aspect of an embodiment of the present invention, a system of a wireless local area network is provided, including at least two stations STAs, and in the at least two STAs, at least one of them is an STA capable of performing backoff of a lower priority access category AC, and is configured to: when two ACs of the STA obtain a transmission opportunity TXOP at the same time and an internal collision occurs, detect a TXOP sharing state of the lower priority AC; and execute backoff of the lower priority AC according to the detected TXOP sharing state.

According to the embodiments of the present invention, a backoff procedure is executed by detecting the TXOP sharing state, distinguished treatment may be performed according to the TXOP sharing state, which ensures fairness of the lower priority AC.

BRIEF DESCRIPTION OF THE DRAWINGS

To illustrate the technical solutions according to the embodiments of the present invention more clearly, accompanying drawings for describing the embodiments are introduced briefly in the following. Obviously, the accompanying drawings in the following description are merely some embodiments of the present invention, and persons of ordinary skill in the art may derive other drawings from the accompanying drawings without making creative efforts.

DETAILED DESCRIPTION OF THE EMBODIMENTS

Figure 1:
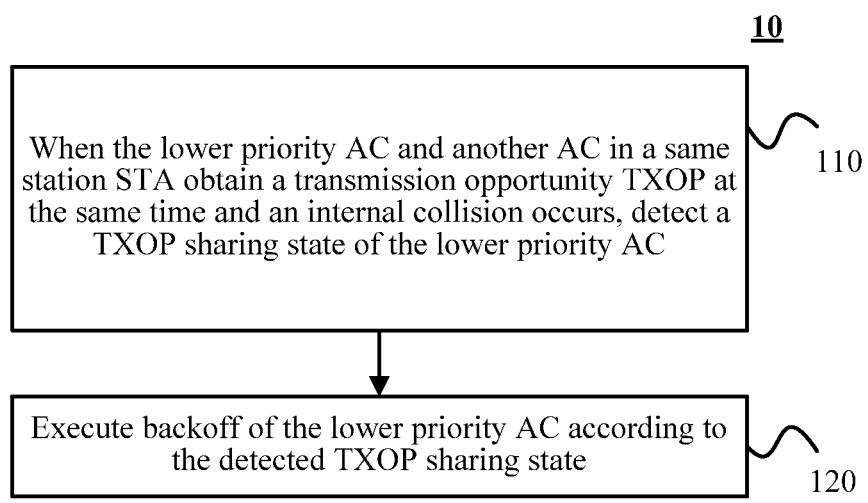
FIG. 1 is a flow chart showing a backoff method used for a lower priority AC when an internal collision occurs according to an exemplary embodiment of the present invention.

The technical solutions of the present invention are clearly and completely described in the following with reference to the accompanying drawings. Obviously, the embodiments described are only part of rather than all of the embodiments of the present invention. All other embodiments obtained by persons skilled in the art based on the embodiments of the present invention without making creative efforts shall fall within the protection scope of the present invention.

In this specification, the embodiments of the present invention are illustrated by taking a WLAN as an example. However, persons skilled in the art should understand that, the technical solutions of the present invention may be applied to all wireless communication systems in which a right to use a channel is obtained based on a contention manner. According to the embodiments of the present invention, in the WLAN, when one AC and another AC of a same STA obtain a TXOP at the same time, that is, an internal collision occurs between the AC and the another AC (usually an AC of a higher priority), a method of the embodiments of the present invention may be adopted to execute a backoff procedure for the AC. A backoff device implemented in the STA may be used to execute the method that is used to execute backoff according to the embodiments of the present invention.

Different STA priorities may be implemented on the basis of distributed access. Specifically, different STAs may have different contention window sizes, where a CW of an AP may be smaller than those of other STAs, and in this way, the AP may obtain more channel access opportunities, thereby embodying its priority on channel access, and implementing some control functions on the STA registered to the AP.

For a certain AC, what triggers a backoff process may be classified into the following 4 events: (a) When it is requested that a frame of the AC is sent, its backoff time is zero but a physical layer or an MAC layer indicates that a channel is busy; (b) When reaching an end of a TXOP initiated by the AC, the last data frame of the AC is transmitted successfully; (c) The first frame of the AC in the TXOP fails to be transmitted; (d) An internal collision between the AC and an AC of a higher priority in a same STA occurs, that is, the AC and another AC in the same STA obtain the TXOP at the same time.

The contention window also has a corresponding changing rule. In an initial state, the window is a minimum value; once the collision occurs or the transmission fails, the window is doubled (become twice the original length) until it reaches a maximum value of the window. After the STA contends for and obtains the channel in the maximum value of the window and the transmission is successful, the window is reset to the minimum value.

The WLAN uses a Multi-User Multiple-Input Multiple-Output (MU-MIMO) technology in the physical layer to increase a data transmission rate of the physical layer, and therefore, correspondingly, a TXOP sharing mechanism is added in an EDCA mechanism to support the technology. Specifically speaking, the mechanism is that, during MU-MIMO communication, an AC obtaining TXOP transmission shares a redundant space-time resource in the TXOP to other ACs. Therefore, TXOP sharing provides an opportunity of data transmission for other ACs not contending successfully. However, the TXOP sharing also brings about a problem of fairness of the lower priority AC, and therefore, according to the embodiments of the present invention, the backoff procedure is determined differently according to a TXOP sharing state.

Specifically, in the embodiments of the present invention, for the event a), a contention window CW[AC] is kept unchanged.

For the event b), due to the successful transmission, the contention window CW[AC] is reset to a minimum window CW_min[AC] of the AC.

For the event c), the contention window CW[AC], according to a preset rule, is reset to the minimum window, doubled, or kept unchanged.

For the event d), the TXOP sharing state is detected first, and the backoff procedure of the AC is executed according to the detected TXOP sharing state.

FIG. 1 is a flow chart showing a backoff method 10 used for a lower priority AC when an internal collision occurs according to an exemplary embodiment of the present invention. A backoff device (for example, an STA) is mainly used to execute the method 10.

When contention occurs, a higher priority AC obtains channel access and initiate data transmission. However, as shown in FIG. 1, according to the embodiment of the present invention, in 110, when a lower priority AC and another AC in the same station STA obtain a TXOP at the same time and an internal collision occurs, detect a TXOP sharing state of the lower priority AC, that is, whether it obtains a TXOP sharing opportunity.

In 120, execute backoff of the lower priority AC according to the detected TXOP sharing state.

The TXOP sharing state may be detected according to a scheduling result of the STA on its AC.

When the internal collision occurs, whether the lower priority AC is applicable to perform TXOP sharing is judged according to a TXOP sharing standard. The TXOP sharing standard is a product implementation problem, and may be self-defined by different manufacturers of devices.

One possible TXOP sharing standard is that: when total resources (such as a sum of space-time stream numbers) ready to be sent to all main AC (for example, the higher priority AC that contends successfully) users are smaller than maximum total resources (such as the maximum space-time stream numbers) that can be supported by a holder of the current TXOP, a secondary AC (for example, the lower priority AC that contends unsuccessfully) may be used to perform the TXOP sharing.

Another possible TXOP sharing standard is that: after the main AC obtains the TXOP, under a condition that estimated TXOP time is sufficient to transmit the main AC, it is determined whether constructing the TXOP sharing with the secondary AC may improve total throughput according to a channel condition or a PER (Package Error Rate, package error rate) curve, and if the total throughput may be improved, the TXOP sharing is constructed. In a situation where multiple secondary ACs capable of constructing the TXOP sharing exist, the secondary AC capable of maximizing the throughput is selected preferentially.

The foregoing standards are only exemplary examples, which is not limited in the present invention. Persons skilled in the art may understand that, the TXOP sharing state may be detected by adopting any suitable method according to an actual need and a design condition.

According to the embodiment of the present invention, a backoff procedure is executed by detecting the TXOP sharing state, distinguished treatment may be performed according to the TXOP sharing state, which ensures fairness of the lower priority AC.

More detailed embodiments of the present invention are described herein through accompanying drawings.

Figure 2:
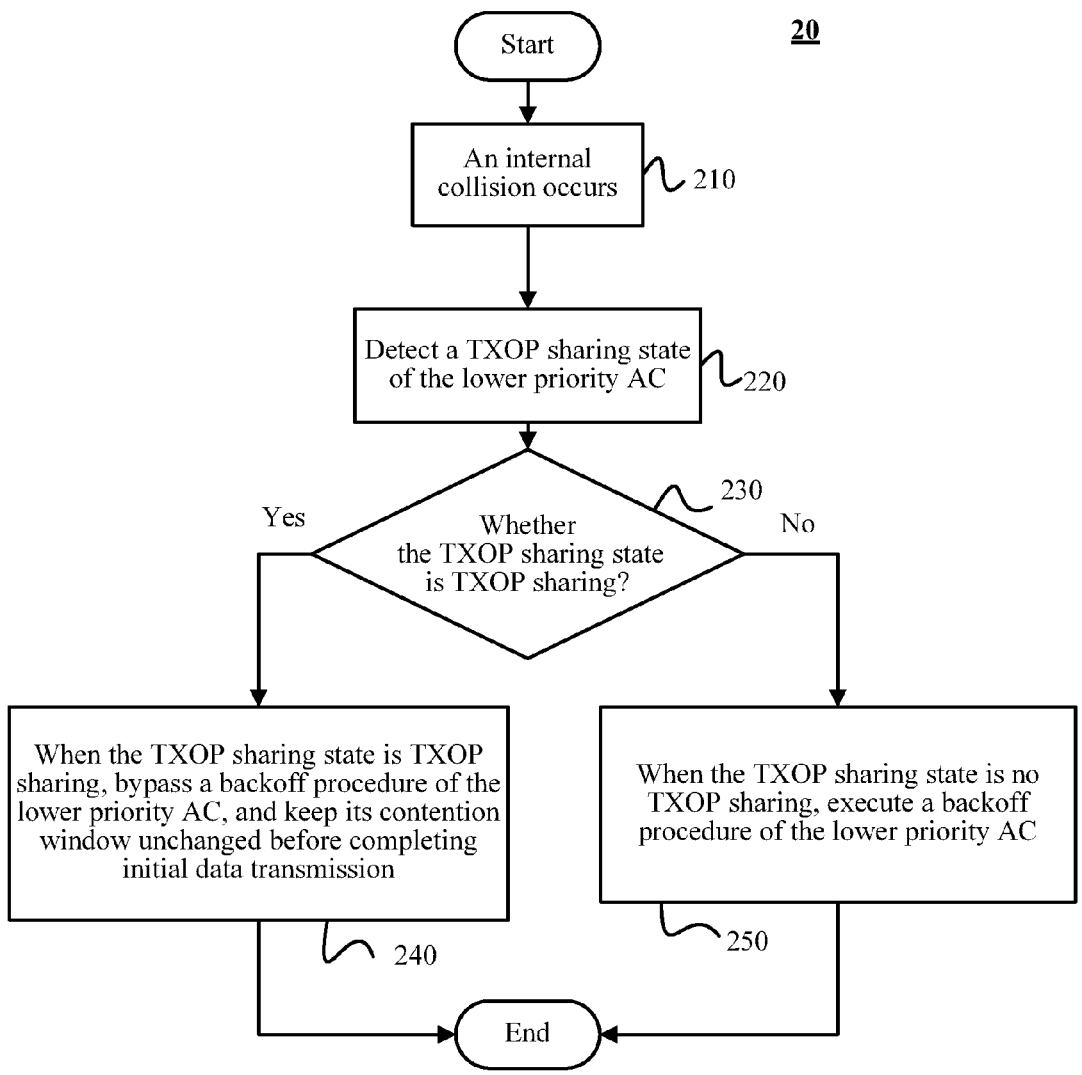
FIG. 2 is a flow chart showing a backoff method according to a further detailed first exemplary embodiment of the present invention.

Referring to FIG. 2, a backoff method 20 according to another further detailed embodiment of the present invention is described.

FIG. 2 is a flow chart showing a backoff method 20 according to a further detailed first exemplary embodiment of the present invention. A backoff device is mainly used to execute the backoff method 20, and the backoff device may be implemented in an STA.

As shown in FIG. 2, when in 210, contention occurs and a lower priority AC fails in the contention, that is, an internal collision occurs, detect a TXOP sharing state of the lower priority AC in 220.

In 230, determine whether the detected TXOP sharing state is TXOP sharing. When it is detected that the TXOP sharing state of the lower priority AC is TXOP sharing, in 240, bypass a backoff procedure of the lower priority AC. Here, the term "bypass" may refer to not execute, that is, in 240, not execute the backoff procedure of the lower priority AC, for example, keep a contention window CW[AC] of the lower priority AC unchanged before completing initial data transmission. The TXOP sharing state being TXOP sharing means that a TXOP may be shared to the lower priority AC, so that the lower priority AC may use the TXOP to transmit data. Definitely, the TXOP may also be shared to other lower priority ACs at the same time. Thereafter, the lower priority AC starts the initial data transmission, and further determines a change of its window according to whether the data transmission is successful. Specifically speaking, when the lower priority AC fails to send a first frame by using the TXOP sharing, the contention window CW[AC] of the lower priority AC may be changed according to the following rules: 1. When the number of retransmission of the lower priority AC reaches a maximum value, the contention window CW[AC] of the AC is reset to its minimum window CW_min[AC]; 2. When the number of retransmission of the lower priority AC does not reach the maximum value and the current CW[AC] is smaller than a maximum window CW_max[AC], the CW[AC] is updated to (CW[AC]+1)× 2−1; and 3. When the number of retransmission of the lower priority AC does not reach the maximum value and the current CW[AC] is equal to the maximum window CW_max[AC], the CW[AC] is kept unchanged in the rest of the retransmission.

The minimum window CW_min[AC] may be, for example, 7, and the maximum window CW_max[AC] may be, for example, 255 (Its unit is aSlotTime, a specific size of which depends on a physical layer protocol. For example, in an orthogonal frequency division multiplexed (OFDM) system with 20 Megahertz (MHz) spacing (OFDM physical layer (PHY) with 20 MHz channel spacing), aSlotTime=9 microseconds (us)). However, the foregoing numerals are merely exemplary, and the CW_min[AC] (may be referred to as CW_min hereinafter) and the CW_max[AC] (may be referred to as CW_max hereinafter) may vary for different ACs.

Therefore, when the contention occurs and the higher priority AC obtains the channel access, in the embodiment of the present invention, whether the lower priority AC obtains the TXOP sharing opportunity is first detected, instead of immediately adjusting the size of the window of the lower priority AC as in the related art, which causes a problem that when the window of the lower priority AC does not reach the maximum value and transmission of the first frame of the lower priority AC fails, its window is doubled twice. Therefore, a problem of expanding the contention window of the lower priority AC for many times in one channel contention is avoided, fairness of the lower priority AC is ensured.

Furthermore, the backoff method 20 according to the embodiment of the present invention may further include 250, where when it is detected that the TXOP sharing state of the lower priority AC is no TXOP sharing, execute the backoff procedure of the lower priority AC.

Specifically, the executing the backoff procedure of the lower priority AC may include changing the contention window CW[AC] of the lower priority AC according to rules similar to those when the transmission of the first frame fails, which is not repeatedly described here.

The following Table 1 shows an exemplary comparison example of window change of the backoff method according to the embodiment of the present invention and the window change of the related art, where it is assumed that the lower priority AC fails in the internal contention, but obtains the TXOP sharing, and the first frame fails to be sent, and it is assumed that initial contention windows (may not be the minimum window) are all CW0.

TABLE 1

|  | Related Art | Embodiment of the Present Invention |
|---|---|---|
| Initial | CW0 | CW0 |
| Fail in the internal contention, but obtain the TXOP sharing, and the first frame fails to be sent | 4*CW0 + 3 | 2*CW0 + 1 |

The following Table 2 shows another exemplary comparison example of the window change of the backoff method according to the embodiment of the present invention and the window change of the related art, where it is assumed that the lower priority AC fails in the internal contention, but obtains the TXOP sharing, and the first frame is sent successfully, and it is assumed that the initial contention windows are all CW0.

TABLE 2

|  | Related Art | Embodiment of the Present Invention |
|---|---|---|
| Initial | CW0 | CW0 |
| Fail in the internal contention, but obtain the TXOP sharing, and the first frame is sent successfully | 2*CW0 + 1 | CW_min |

It can be seen from a comparison of the foregoing Table 1 and Table 2 that, in a situation of failing in the internal contention but obtaining the TXOP sharing, if the first frame is sent successfully, according to the embodiment of the present invention, the contention window of the lower priority AC may even be reset to the minimum window CW_min, while the method of the related art unnecessarily changes the contention window of the lower priority AC, which results in a larger numeral of the contention window, affecting the fairness of the AC. In a situation that the first frame fails to be sent, according to the related art, the contention window is even doubled for many times, which greatly affects the next contention of the lower priority AC, affects the fairness of the AC more seriously, and limits a service of the lower priority AC. Therefore, the embodiment of the present invention executes different procedures according to the TXOP sharing state, and the number of changes of the contention window of the lower priority AC is obviously reduced, which ensures the fairness of the lower priority AC.

Figure 3:
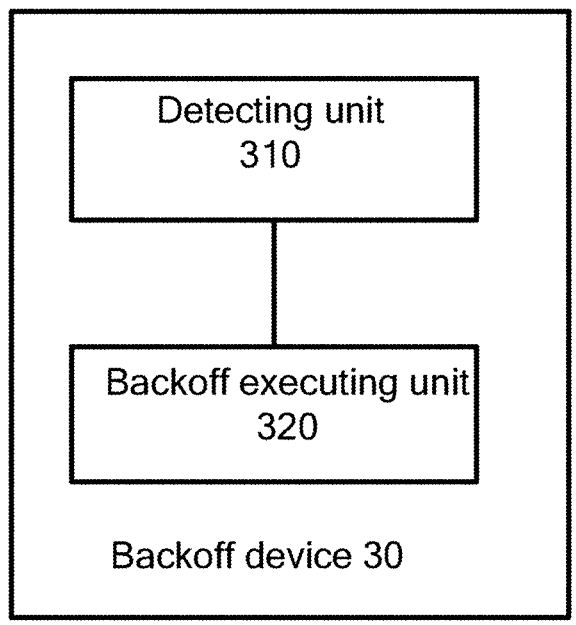
FIG. 3 is a block diagram showing a backoff device according to an exemplary embodiment of the present invention.

FIG. 3 is a block diagram showing a backoff device 30 according to an exemplary embodiment of the present invention. The backoff device 30 may be an STA. As shown in FIG. 3, the backoff device 30 may include a detecting unit 310 and a backoff executing unit 320.

Specifically, the detecting unit 310 is configured to, when a lower priority AC and another AC in the same station STA obtain a TXOP at the same time and an internal collision occurs, detect a transmission opportunity TXOP sharing state of the lower priority AC; and the backoff executing unit 320 is configured to execute backoff of the lower priority AC according to the detected TXOP sharing state.

According to the embodiment of the present invention, the backoff device 30 (that is, the STA) executes a backoff procedure by detecting the TXOP sharing state, distinguished treatment may be performed according to the TXOP sharing state, which ensures fairness of the lower priority AC.

The detecting unit 310 may detect the TXOP sharing state according to a scheduling result of the STA on its AC, which is not repeatedly described here. In addition, the backoff executing unit 320 may also execute the related procedure in FIG. 2, which is not repeatedly described here.

Moreover, a system of a wireless local area network according to an embodiment of the present invention may include at least two stations STAs, in the at least two STAs, at least one of them is an STA capable of performing backoff of a lower priority access category AC, and is configured to: when two ACs of the STA obtain a transmission opportunity TXOP at the same time and an internal collision occurs, detect a TXOP sharing state of the lower priority AC; and execute the backoff of the lower priority AC according to the detected TXOP sharing state. The detecting unit 310 may be used to execute, when the lower priority AC and another AC in the STA obtain the TXOP at the same time and the internal collision occurs, the function of detecting the TXOP sharing state of the lower priority AC, and the backoff executing unit 320 may be used to execute the function of executing the backoff of the lower priority AC according to the detected TXOP sharing state.

Figure 4:
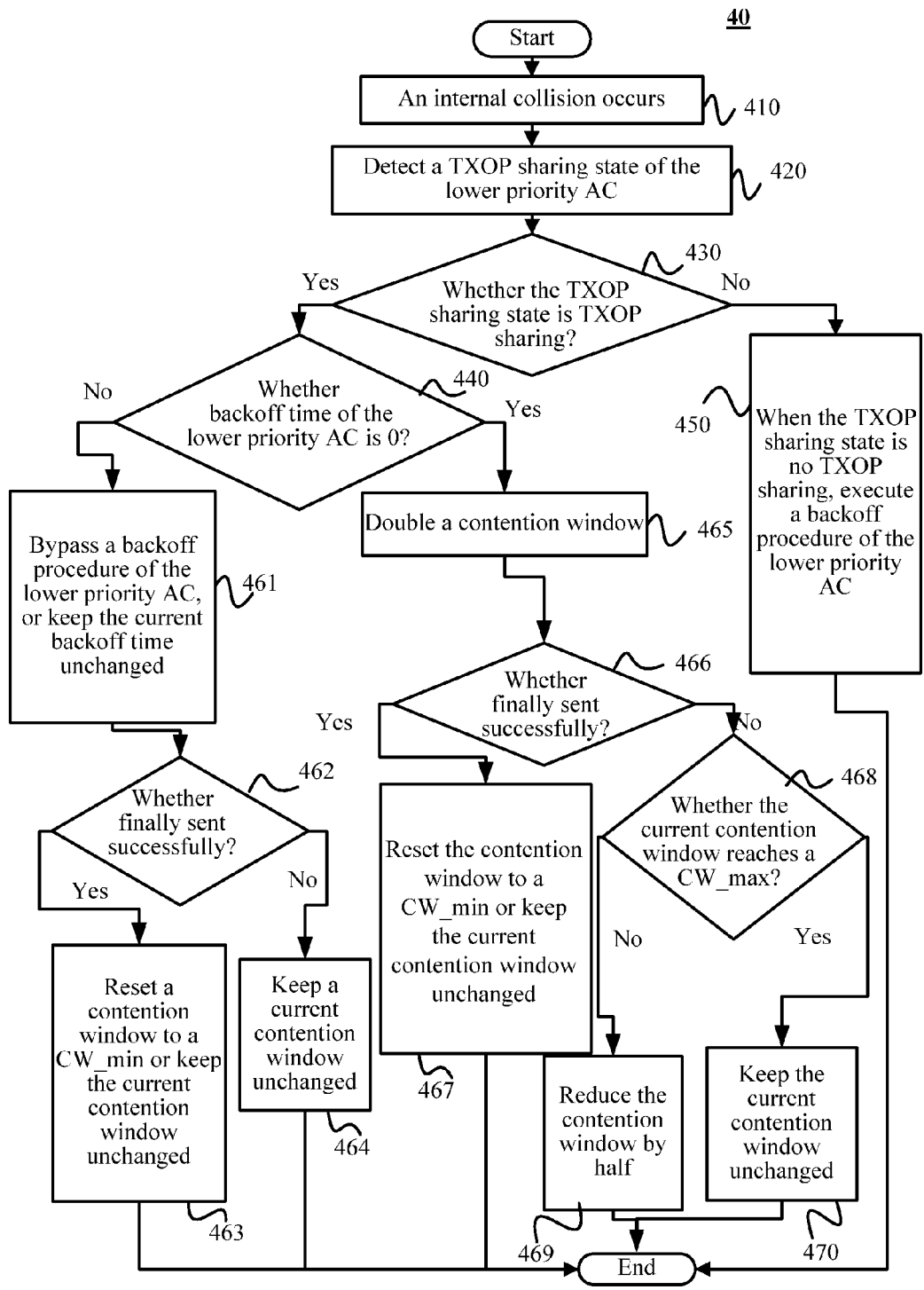
FIG. 4 is a flow chart showing a backoff method according to a further detailed second exemplary embodiment of the present invention.

FIG. 4 is a flow chart showing a backoff method 40 according to a further detailed second exemplary embodiment of the present invention. A backoff device is mainly used to execute the backoff method 40, and the backoff device may be implemented in an STA.

In the method 40, in 410, when contention occurs and a lower priority AC fails in the contention, that is, an internal collision occurs, in 420, detect a TXOP sharing state of the lower priority AC.

In 430, judge whether the detected TXOP sharing state is TXOP sharing.

If in 430, the lower priority AC does not obtain the TXOP sharing (No in 430), in 450, execute a backoff procedure of the lower priority AC. Then, end the method 40.

If in 430, the lower priority AC obtains the TXOP sharing state (Yes in 430), in 440, judge whether backoff time of the lower priority AC is 0.

On the one hand, if in 440, the backoff time of the lower priority AC is not 0 (No in 440), in 461, bypass the backoff procedure of the lower priority AC, or keep the current backoff time unchanged.

Thereafter, in 462, judge whether data of the lower priority AC is finally sent successfully. Specifically speaking, it may be judged whether the data of the lower priority AC is sent successfully at an end time of sending or when the sending of the data of the AC ends.

If in 462, the data of the lower priority AC is finally sent successfully (Yes in 462), in 463, reset a contention window to a minimum contention window CW_min or keep the current contention window unchanged. Specifically speaking, if the sending is successful, the current contention window may be set to the CW_min when the current contention window reaches a CW_max and the number of Retry reaches a Retry limit value, and the current contention window may be kept unchanged when not reaching the CW_max. Then, end the method 40.

If in 462, the data of the lower priority AC is finally sent unsuccessfully (No in 462), in 464, keep the current contention window unchanged. Then, end the method 40.

On the other hand, if in 440, the backoff time of the lower priority AC is 0 (Yes in 440), in 465, double the current contention window of the lower priority AC.

Thereafter, in 466, judge whether the data of the lower priority AC is finally sent successfully.

If in 466, the data of the lower priority AC is finally sent successfully (Yes in 466), in 467, reset the contention window to the minimum contention window CW_min or keep the current contention window unchanged. Then, end the method 40.

If in 466, the data of the lower priority AC is finally sent unsuccessfully (No in 466), in 468, further judge whether the current contention window reaches the CW_max, and reset the contention window according to the following rules: If the current contention window does not reach the maximum contention window CW_max (No in 468), in 469, reduce the contention window by half, and then, end the method 40; and If the current contention window has reached the maximum contention window CW_max (Yes in 468), in 470, keep the current contention window unchanged, and then, end the method 40.

In the embodiment of the present invention, the doubling the contention window by half is a simplified appellation, and a specific relationship is that: if the current contention window is recorded as CW0, the contention window becomes (CW0−1)/2 after being reduced by half.

Figure 5:
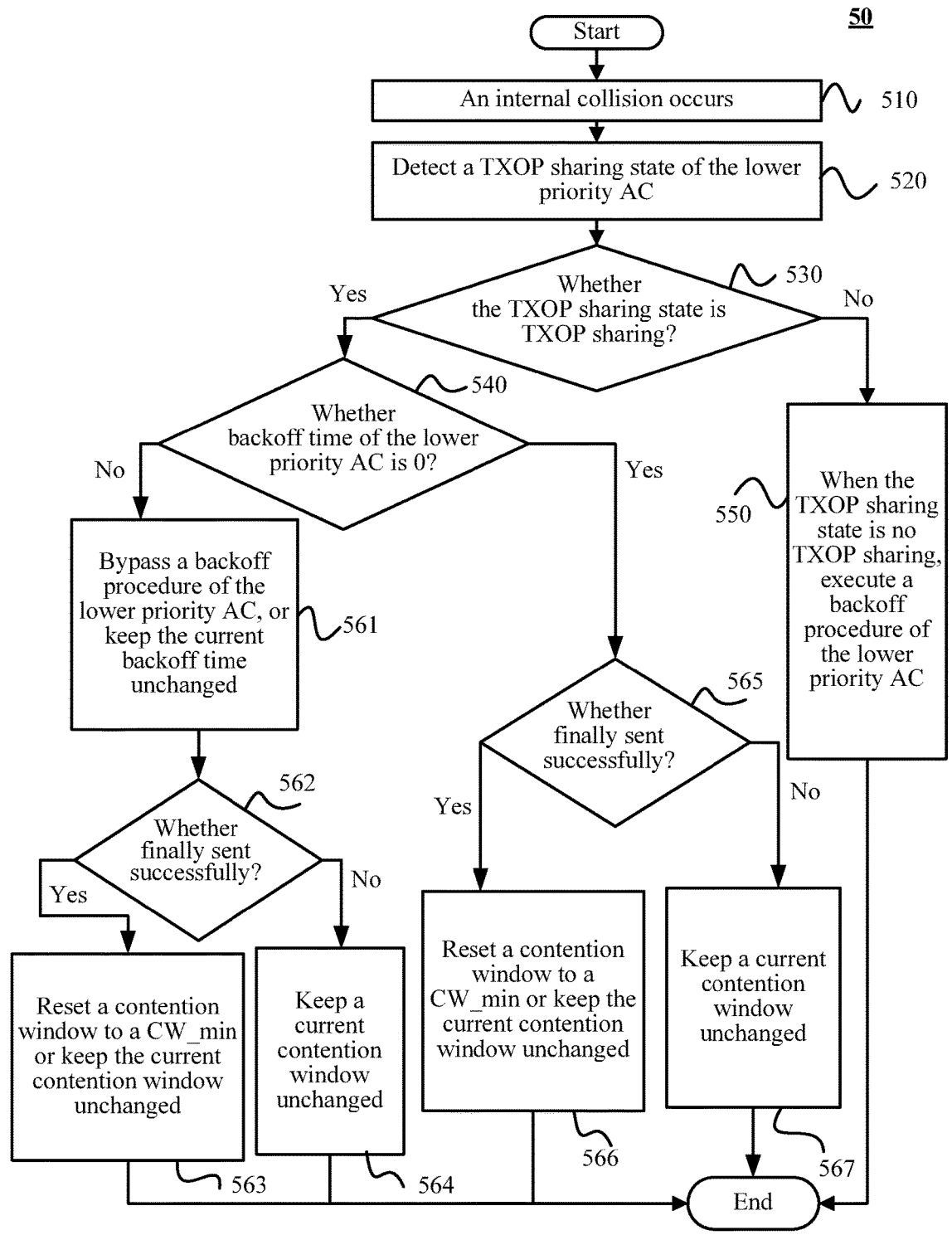
FIG. 5 is a flow chart showing a backoff method according to a further detailed third exemplary embodiment of the present invention.

FIG. 5 is a flow chart showing a backoff method 50 according to a further detailed third exemplary embodiment of the present invention. A backoff device is mainly used to execute the backoff method 50, and the backoff device may be implemented in an STA.

In the method 50, in 510, when contention occurs and a lower priority AC fails in the contention, that is, an internal collision occurs, in 520, detect a TXOP sharing state of the lower priority AC.

In 530, judge whether the detected TXOP sharing state is TXOP sharing.

If in 530, the lower priority AC does not obtain the TXOP sharing (No in 530), in 550, execute a backoff procedure of the lower priority AC. Then, end the method 50.

If in 530, the lower priority AC obtains the TXOP sharing state (Yes in 530), in 440, judge whether backoff time of the lower priority AC is 0.

On the one hand, if in 540, the backoff time of the lower priority AC is not 0 (No in 540), in 561, bypass the backoff procedure of the lower priority AC, or keep the current backoff time unchanged.

Thereafter, in 562, judge whether data of the lower priority AC is finally sent successfully. Specifically speaking, it may be judged whether the data of the lower priority AC is sent successfully at an end time of sending or when the sending of the data of the AC ends.

If in 562, the data of the lower priority AC is finally sent successfully (Yes in 562), in 563, reset a contention window to a minimum contention window CW_min or keep the current contention window unchanged. Specifically speaking, if the sending is successful, the current contention window may be set to the CW_min when the current contention window reaches a CW_max and the number of Retry reaches a Retry limit value, and the current contention window may be kept unchanged when not reaching the CW_max. Then, end the method 50.

If in 562, the data of the lower priority AC is finally sent unsuccessfully (No in 562), in 564, keep the current contention window unchanged. Then, end the method 50.

On the other hand, in this embodiment, if in 540, the backoff time of the lower priority AC is 0 (Yes in 540), different from the second exemplary embodiment, do not reset the contention window temporarily (unchanged), and then determine a size of the contention window according to a final sending result of the data of the lower priority AC, that is, in 565, judge whether the data of the lower priority AC is finally sent successfully.

If in 565, the data of the lower priority AC is finally sent successfully (Yes in 565), in 566, reset the contention window to the minimum contention window CW_min or keep the current contention window unchanged. Similarly to the foregoing, the current contention window may be set to the CW_min when the current contention window reaches the CW_max and the number of Retry reaches the Retry limit value, and the current contention window may be kept unchanged when not reaching the CW_max. Then, end the method 50.

If in 565, the data of the lower priority AC is finally sent unsuccessfully (No in 565), in 567, keep the current contention window unchanged. Then, end the method 50.

Figure 6:
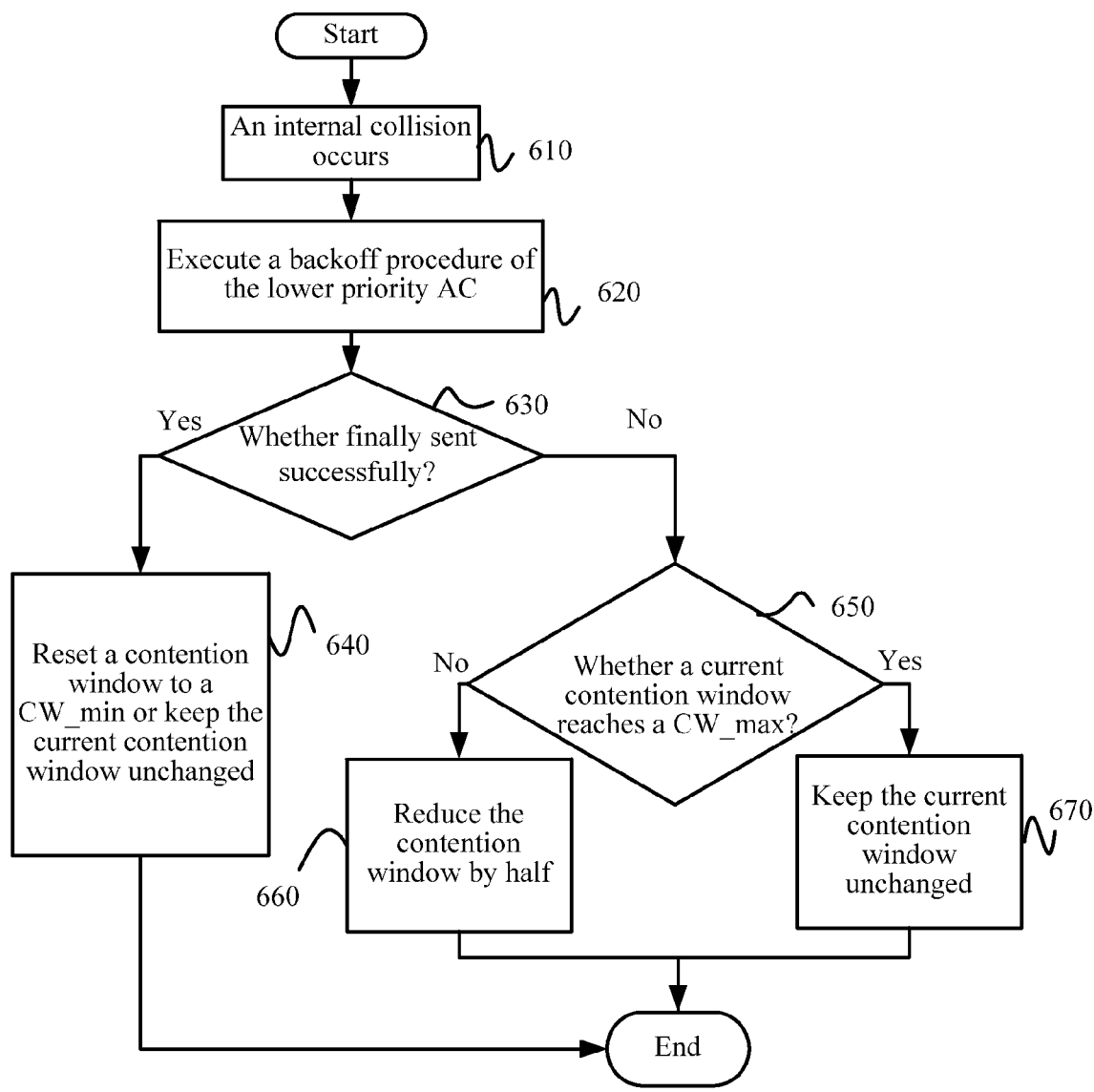
FIG. 6 is a flow chart showing a backoff method according to a further detailed fourth exemplary embodiment of the present invention.

FIG. 6 is a flow chart showing a backoff method 60 according to a further detailed fourth exemplary embodiment of the present invention. A backoff device is mainly used to execute the backoff method 60, and the backoff device may be implemented in an STA.

In the method 60, in 610, when contention occurs and a lower priority AC fails in the contention, that is, an internal collision occurs, in 620, execute a backoff procedure of the lower priority AC, that is, double a contention window.

Thereafter, in 630, judge whether data of the lower priority AC is finally sent successfully.

If in 630, the data of the lower priority AC is finally sent successfully (Yes in 630), reset the contention window to a minimum contention window CW_min or keep the current contention window unchanged. Then, end the method 60.

If in 630, the data of the lower priority AC is finally sent unsuccessfully (No in 630), in 650, further judge whether the current contention window reaches a CW_max, and reset the contention window according to the following rules: If in 650, the current contention window does not reach the maximum contention window CW_max (No in 650), in 660, reduce the contention window by half, and then, end the method 60; and If in 650, the current contention window has reached the maximum contention window CW_max (Yes in 650), in 670, keep the current contention window unchanged, and then, end the method 60.

Figure 7:
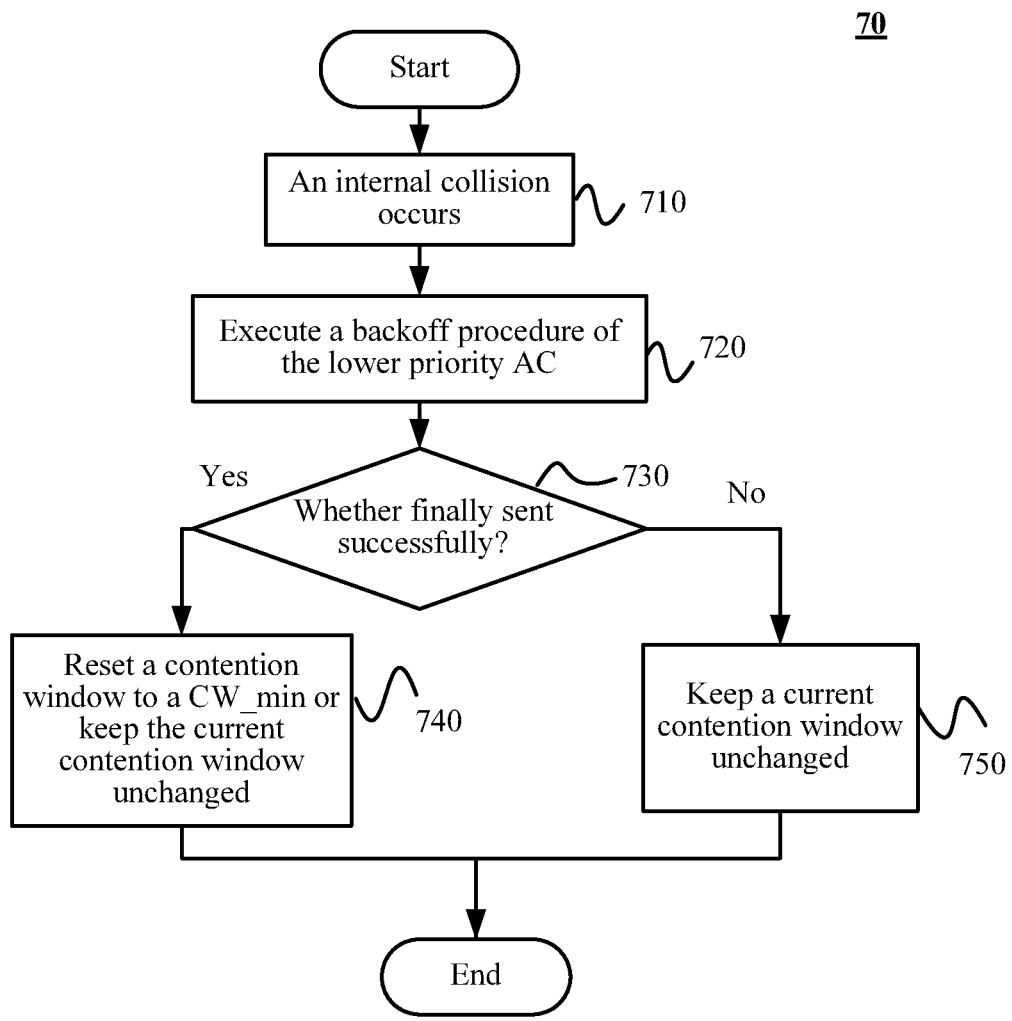
FIG. 7 is a flow chart showing a backoff method according to a further detailed fifth exemplary embodiment of the present invention.

FIG. 7 is a flow chart showing a backoff method 70 according to a further detailed fifth exemplary embodiment of the present invention. A backoff device is mainly used to execute the backoff method 70, and the backoff device may be implemented in an STA.

In the method 70, in 710, when contention occurs and a lower priority AC fails in the contention, that is, an internal collision occurs, in 720, execute a backoff procedure of the lower priority AC, that is, double a contention window.

Thereafter, do not reset the contention window of the lower priority AC temporarily (unchanged), and then determine a size of the contention window according to a final sending result of data of the lower priority AC, that is, in 730, judge whether the data of the lower priority AC is finally sent successfully.

If in 730, the data of the lower priority AC is finally sent successfully (Yes in 730), in 740, reset the contention window to a minimum contention window CW_min or keep the current contention window unchanged. Then, end the method 70.

If in 730, the data of the lower priority AC is finally sent unsuccessfully (No in 730), keep the current contention window unchanged. Then, end the method 70.

Further, the backoff device of the embodiments of the present invention can also implement the foregoing further specific method embodiments, and complete the corresponding processes and functions. In an implementation manner, the detecting unit 310 may be further configured to judge whether the backoff time of the lower priority AC is 0. The backoff executing unit 320 may be further configured to execute the corresponding backoff procedure and a procedure of setting the contention window according to whether the backoff time is 0. In another implementation manner, when the lower priority AC obtains the TXOP sharing state, the backoff executing unit 320 may be further configured to, after the internal collision occurs, execute the backoff procedure of the lower priority AC, that is, double the contention window; if the data of the lower priority AC is finally sent successfully after doubling the contention window, reset the contention window to the minimum contention window CW_min or keep the current contention window unchanged, and if the data of the lower priority AC is finally sent unsuccessfully, reset the contention window according to the foregoing rules. The backoff executing unit 320 may further be configured to, after the internal collision occurs, not reset the contention window of the lower priority AC temporarily (unchanged), and then determine the size of the contention window according to the final sending result of the data of the lower priority AC; if the data of the lower priority AC is finally sent successfully, set the contention window to the minimum contention window CW_min or keep the current contention window unchanged, and if the data of the lower priority AC is finally sent unsuccessfully, keep the current contention window unchanged.

Moreover, the embodiments of the present invention may be applied to all wireless communication systems in which the right of using the channel is obtained based on the contention manner (for example, a WLAN (IEEE 802.11).

Persons of ordinary skill in the art may realize that, the units and algorithm steps of each embodiment described in combination with the embodiments disclosed here can be implemented by electronic hardware, computer software, or a combination of the two. In order to clearly describe interchangeability between the hardware and the software, compositions and steps of each example have been generally described according to functions in the foregoing descriptions. Whether the functions are executed in a manner of hardware or software depends on particular applications and design constraint conditions of the technical solutions. Persons skilled in the art may use different methods to implement the described functions for each particular application, but it should not be considered that the implementation goes beyond the scope of the present invention.

Persons skilled in the art may clearly understand that, for convenience and compactness of description, reference may be made to the corresponding procedures in the foregoing method embodiments for specific working procedures of the foregoing described system, apparatus and units, which are not repeatedly described here.

In the several embodiments provided in the application, it should be understood that, the disclosed system, apparatus and method may be implemented in other manners. For example, the apparatus embodiment described in the foregoing is only schematic. For example, division of the units is only division of logical functions, and other division manners may be used during actual implementation. For example, multiple units or components may be combined or integrated into another system, or some features may be omitted, or not executed. In addition, the shown or discussed mutual coupling or direct coupling or communication connection may be indirect coupling or communication connection through some interfaces, apparatuses or units, and may be electrical, mechanical, or of other forms.

The units described as separate components may be or may not be physically separated. Components shown as units may be or may not be physical units, that is, may be located in one place or distributed to a plurality of network units. Part of or all of the units may be selected to achieve the objectives of the solutions of the embodiments according to an actual need.

In addition, in each embodiment of the present invention, each functional unit may be integrated into one processing unit, and may also be separated and exist physically, and two or more than two units may also be integrated into one unit. The integrated unit may be implemented in the form of hardware, and also be implemented in the form of software.

The integrated unit, when being implemented in the form of a software function unit and sold or used as an independent product, may be stored in a computer readable storage medium. Based on such understanding, the technical solutions of the present invention or the part that makes contribution to the prior art or part of or all of the technical solutions may be embodied in the form of a software product. The computer software product may be stored in a storage medium including several instructions to instruct a computer equipment (may be a personal computer, a server, or a network equipment) to execute all or part of the steps in the methods described in each embodiment of the present invention. The storage medium includes: various medium capable of storing program codes, such as a Universal Serial Bus (USB) disk, a removable hard disk, a read-only memory (ROM), a random access memory (RAM), a magnetic disk, or a compact disk.

It should be further pointed out that, in the apparatus and method of the embodiments of the present invention, obviously, components or steps may be split and/or recombined. The split and/or recombination should be considered as equivalent solutions of the embodiments of the present invention. Moreover, steps for performing the foregoing series of processing may be executed in a time order naturally according to an order of the description, however, they are not necessarily executed according to the time order. Some certain steps may be executed in parallel or independently with each other.

What is claimed is:

1. A backoff method used for a lower priority access category (AC), comprising:
   detecting a transmission opportunity (TXOP) sharing state of the lower priority AC when the lower priority AC and another AC in a same station (STA) obtain a TXOP at a same time and an internal collision occurs, wherein detecting the TXOP sharing state of the lower priority AC comprises determining whether the lower priority AC is suitable for TXOP sharing according to a TXOP sharing standard, and wherein the TXOP sharing standard comprises at least one of an available amount of transmission capacity in the TXOP and an improvement to a total throughput of the TXOP; and
   executing a backoff of the lower priority AC according to the detected TXOP sharing state, wherein executing the backoff of the lower priority AC according to the detected TXOP sharing state comprises:
   bypassing a backoff procedure of the lower priority AC when detecting that the TXOP sharing state of the lower priority AC is TXOP sharing; and
   keeping a contention window (CW[AC]) of the lower priority AC unchanged and performing data transmissions when detecting that the TXOP sharing state of the lower priority AC is TXOP sharing.

2. The method according to claim 1, wherein executing the backoff of the lower priority AC according to the detected TXOP sharing state comprises executing the backoff procedure of the lower priority AC when detecting that the TXOP sharing state of the lower priority AC is not TXOP sharing.

3. The method according to claim 1, wherein when the lower priority AC performs data transmission and a first frame fails to be sent, the method further comprises:
   resetting the CW[AC] of the lower priority AC to its minimum contention window (CW_min[AC]) when a number of retransmissions of the lower priority AC reaches a maximum value;
   updating the CW[AC] of the lower priority AC to (CW[AC]+1)×2−1 when the number of retransmissions of the lower priority AC does not reach the maximum value and a current CW[AC] is smaller than a maximum contention window (CW_max[AC]); and
   keeping the CW[AC] unchanged in the rest of the retransmissions when the number of retransmissions of the lower priority AC does not reach the maximum value and the current CW[AC] is equal to the CW_max[AC].

4. The method according to claim 1, wherein executing the backoff of the lower priority AC according to the detected TXOP sharing state comprises:
   determining whether a backoff time of the lower priority AC is 0 when the lower priority AC obtains the TXOP sharing state;
   either bypassing the lower priority backoff procedure or keeping a current backoff time unchanged when the backoff time of the lower priority AC is not 0; and
   doubling the CW[AC] of the lower priority AC when the backoff time of the lower priority AC is 0.

5. The method according to claim 4, wherein the method further comprises:
determining whether data of the lower priority AC is finally sent successfully when the backoff time of the lower priority AC is 0 and its CW[AC] has been doubled; and
either resetting the CW[AC] to a minimum contention window (CW_min[AC]) or keeping a current CW[AC] unchanged when the data of the lower priority AC is finally sent successfully.

6. The method according to claim 1, wherein executing the backoff of the lower priority AC according to the detected TXOP sharing state comprises doubling the CW[AC] of the lower priority AC when the lower priority AC has the internal collision.

7. The method according to claim 6, wherein the method further comprises:
determining whether data of the lower priority AC is finally sent successfully; and
either setting the CW[AC] to a minimum contention window (CW_min[AC]) or keeping a current CW[AC] unchanged when the data of the lower priority AC is finally sent successfully.

8. The method according to claim 1, wherein executing the backoff of the lower priority AC according to the detected TXOP sharing state comprises determining the CW[AC] of the lower priority AC according to a final sending result of data of the lower priority AC when the lower priority AC obtains the TXOP sharing state.

9. The method according to claim 8, wherein the determining the CW[AC] of the lower priority AC according to the final sending result of the data of the lower priority AC comprises:
either setting the CW[AC] to a minimum contention window (CW_min[AC]) or keeping the current CW[AC] unchanged when the data of the lower priority AC is finally sent successfully; and
keeping the CW[AC] of the lower priority AC unchanged when the data of the lower priority AC is finally sent unsuccessfully.

10. The method according to claim 1, wherein the TXOP sharing state of the lower priority AC is detected according to a scheduling result of the STA.

11. The method according to claim 1, wherein the improvement to the total throughput of the TXOP is determined according to at least one of a TXOP channel condition and a package error rate (PER) curve.

12. The method according to claim 1, wherein executing the backoff of the lower priority AC according to the detected TXOP sharing state ensures fair treatment of the lower priority AC by not repeatedly extending the CW[AC] of the lower priority AC when the internal collision occurs between the lower priority AC and a higher priority AC.

13. A wireless terminal station (STA), comprising:
a computer processor configured to:
detect a transmission opportunity (TXOP) sharing state of a lower priority access category (AC) when two ACs in the STA obtain a TXOP at a same time and an internal collision occurs, wherein detecting the TXOP sharing state of the lower priority AC comprises determining whether the lower priority AC is suitable for TXOP sharing according to a TXOP sharing standard, and wherein the TXOP sharing standard comprises at least one of an available amount of transmission capacity in the TXOP and an improvement to a total throughput of the TXOP; and
execute a backoff of the lower priority AC according to the detected TXOP sharing state, wherein executing the backoff of the lower priority AC according to the detected TXOP sharing state comprises:
bypassing a backoff procedure of the lower priority AC when detecting that the TXOP sharing state of the lower priority AC is TXOP sharing; and
keeping a contention window (CW[AC]) of the lower priority AC unchanged and performing data transmissions when detecting that the TXOP sharing state of the lower priority AC is TXOP sharing.

14. The STA according to claim 13, wherein the computer processor executes the backoff procedure of the lower priority AC when the TXOP sharing state of the lower priority AC is no TXOP sharing.

15. The STA according to claim 14, wherein when the lower priority AC performs data transmission and a first frame fails to be sent, the computer processor is further configured to:
reset the CW[AC] of the lower priority AC to its minimum contention window (CW_min[AC]) when a number of retransmissions of the lower priority AC reaches a maximum value;
update the CW[AC] of the lower priority AC to (CW[AC]+1)×2−1 when the number of retransmissions of the lower priority AC does not reach the maximum value and a current CW[AC] is smaller than a maximum contention window (CW_max[AC]); and
keep the CW[AC] unchanged in the rest of the retransmissions when the number of retransmissions of the lower priority AC does not reach the maximum value and the current CW[AC] is equal to the CW_max[AC].

16. The STA according to claim 13, wherein the computer processor is further configured to:
determine whether backoff time of the lower priority AC is 0;
either bypass the lower priority backoff procedure or keep a current backoff time unchanged when the backoff time of the lower priority AC is not 0; and
double the CW[AC] of the lower priority AC when the backoff time of the lower priority AC is 0.

17. The STA according to claim 16, wherein the computer processor is further configured to:
determine whether data of the lower priority AC is finally sent successfully; and
either reset the CW[AC] to a minimum contention window (CW_min [AC]) or keep a current CW[AC] unchanged when the data of the lower priority AC is finally sent successfully.

18. The STA according to claim 16, wherein the computer processor is further configured to:
determine whether data of the lower priority AC is finally sent successfully;
reset the CW[AC] of the lower priority AC when the data of the lower priority AC is finally sent unsuccessfully, and wherein a resetting method comprises one of:
reducing a current CW[AC] by half when the current CW[AC] does not reach a maximum contention window (CW_max[AC]); and
keeping the current CW[AC] unchanged when the current CW[AC] has reached the CW_max [AC].

19. A system of a wireless local area network, comprising:
at least two stations (STAs), wherein in the STAs, at least one STA is capable of performing backoff of a lower priority access category (AC) and is configured to:
detect a transmission opportunity (TXOP) sharing state of the lower priority AC when two ACs of the STA obtain a TXOP at a same time and an internal collision occurs, wherein detecting the TXOP sharing state of the lower priority AC comprises determining whether the lower priority AC is suitable for TXOP sharing according to a TXOP sharing standard, and wherein the TXOP sharing standard comprises at least one of an available amount of transmission capacity in the TXOP and an improvement to a total throughput of the TXOP; and execute the backoff of the lower priority AC according to the detected TXOP sharing state, wherein executing the backoff of the lower priority AC according to the detected TXOP sharing state comprises:

bypassing a backoff procedure of the lower priority AC when detecting that the TXOP sharing state of the lower priority AC is TXOP sharing; and keeping a contention window (CW[AC]) of the lower priority AC unchanged and performing data transmissions when detecting that the TXOP sharing state of the lower priority AC is TXOP sharing.

* * * * *